United States Patent

[11] 3,629,943

| | | |
|---|---|---|
| [72] | Inventor | Abraham Gindea<br>Brooklyn, N.Y. |
| [21] | Appl. No. | 54,105 |
| [22] | Filed | July 13, 1970 |
| [45] | Patented | Dec. 28, 1971 |
| [73] | Assignee | Whaledent, Inc.<br>Brooklyn, N.Y. |

[54] DENTAL PROSTHETIC ASSEMBLY
11 Claims, 3 Drawing Figs.

[52] U.S. Cl. .................................................. 32/13
[51] Int. Cl. .................................................. A61c 5/08
[50] Field of Search ...................................... 32/13

[56] References Cited
UNITED STATES PATENTS
965,246 7/1910 Stallman ........................ 32/13
1,517,500 12/1924 Fredericks .................... 32/13

*Primary Examiner*—Robert Peshock
*Attorney*—Friedman & Goodman

ABSTRACT: Apparatus and method for securing a dental prosthetic structure, such as a false tooth, to a patient's tooth stub and comprising the drilling of a bore in the tooth stub, inserting a preformed hollow sleeve having a closed distal end and an open proximal end in the bore so drilled, inserting the lower end portion of an intermediate rod member within the opening in said sleeve to frictionally secure the same therein forming a dental prosthetic structure with an opening in the bottom thereof and with the bottom peripheral surface thereof conformed with that of the prepared tooth stub or jawbone, and bending over the upper portion of said rod member upon itself and securing the bent-over rod portion within the opening in said dental prosthetic structure by means of a self-curing resin to thereby secure said prosthetic structure with respect to said prepared tooth stub.

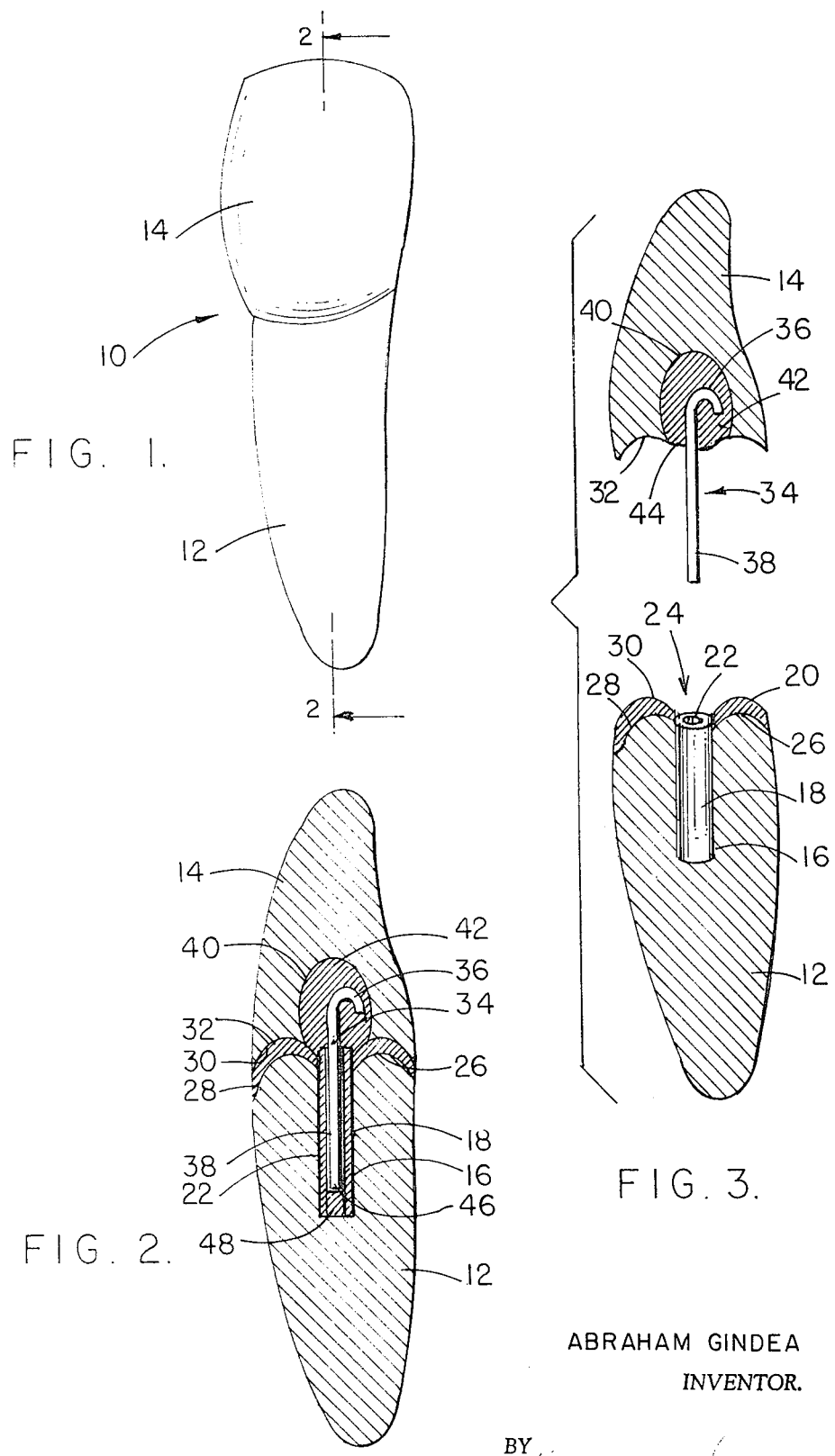

DENTAL PROSTHETIC ASSEMBLY

The present invention pertains to a new and novel dental prosthetic assembly, and more particularly to an apparatus for use in conjunction with dental prosthetic structures, and to the method by which the assembly is connected to a patient's tooth stub to permit the prosthetic structure to be secured with respect thereto.

SUMMARY OF THE INVENTION

Accordingly, it is the primary object of the present invention to provide a new and novel dental prosthetic assembly which permits a prosthetic structure to be firmly secured to an existing tooth stub.

It is another object of the present invention to provide an assembly of the aforementioned type which includes the use of substantially preformed standardized members wherein the dental prosthetic structure is specially prepared to cooperate with the standardized members for conformed securement with respect to the tooth stub.

It is a further object of the present invention to provide an assembly of the aforementioned type employing a preformed hollow sleeve and an intermediate rodlike joinder member.

BRIEF DESCRIPTION OF THE DRAWINGS

These and other objects, features and advantages of the present invention will become more apparent from the detailed description hereinafter considered in conjunction with the accompanying drawings, wherein:

FIG. 1: is a front elevational view of a dental prosthetic assembly constructed in accordance with the principles of the present invention;

FIG. 2: is a cross-sectional view of the assembly depicted in FIG. 1 taken on line 2—2 thereof; and FIG. 3 is an exploded cross-sectional view depicting the components comprising the dental prosthetic assembly of FIG. 2.

DESCRIPTION OF THE SPECIFIC EMBODIMENTS

Referring now to the drawings, and more particularly to FIG. 7 thereof, there is shown a dental prosthetic assembly, generally denoted by the reference numeral 10 and constructed in accordance with the present invention. The assembly 10 includes a tooth stub 12 to which a dental prosthetic structure 14, such as a false tooth, is secured.

In the fabrication of the assembly 10, the first step required for the securement of the structure 14 to the tooth stub 12, is the drilling of a bone 16 to a predetermined depth in the prepared tooth stub, as best seen in FIG. 3. The depth and diameter of the bore 16 are selected so as to be substantially equal to that of the external diameter and length of preformed hollow sleeve 18. The sleeve 18 is preferably formed of gold but may also be fabricated from any other suitable metal or material.

After the drilling of the bore 16, the sleeve 18 is placed in mating engagement therein, the sleeve 18 is removed and a saddle 20 extending laterally therefrom and outwardly of the opening 22 in the sleeve 18 is case integrally with the sleeve, such as by the well-known lost wax process to form an integral insert assembly, designated generally by the reference numeral 24. The configuration of the lower surface 26 of the saddle 20 is conformed that of the peripheral surface 28 of the prepared tooth stub 12, while the upper peripheral surface 30 of the saddle is made conformal with the lower peripheral surface 32 of the false tooth 14.

The assembly 10 also includes an intermediate member defining a rod 34 whose upper portion is bent over upon itself to form an anchoring member 36 and the lower portion 38 of which is adapted to be frictionally insertable into the opening 22 of the sleeve 18; the diameter of the rod 34 is slightly less than that of opening 22 to permit the frictional engagement.

The false tooth 14 has a central opening 40 drilled or otherwise formed in the bottom surface 32 thereof. The opening 40 is formed having a sufficient depth to accommodate the upper portion of the rod 34 including the anchoring member 36 which is secured therein by means of a self-curing resin 42, as described hereinafter. The peripheral surface 32 is made conformal with the upper peripheral surface 30 of the saddle 20.

In the fabrication of the assembly 10, the insert assembly 24 is secured with respect to the bored and prepared tooth stub 12, such as by cementing. The upper portion of rod 34 including anchoring member 36 is then secured within the opening 40 by means of the self-curing resin 42.

The lower exposed surface 44 of the resin 42 is made conformal with the central portion of saddle 20.

The lower portion 38 of rod 34 is inserted in opening 22 and is frictionally engageable therein with the distal end 46 of the rod being slightly spaced from the distal end 48 of the opening 22, as best seen in FIG. 2. The surface 44 of the resin 42 then seats conformally within the central portion of the saddle 20, while the surface 32 and 30 are in conformed registration.

While I have shown and described the preferred embodiment of may invention, it will be readily understood by those skilled in the art that there are many modification, changes and improvements which may be made therein without departing from the spirit and scope thereof as defined in the appended claims.

I claim:

1. A dental prosthetic assembly comprising a preformed hollow sleeve member adapted to be inserted and secured within a conformally shaped bore in a tooth stub in a patient's mouth,
    said sleeve member having a longitudinal opening and a closed distal end,
    an intermediate rod member,
    a dental prosthetic structure,
    a lower end portion of said intermediate rod member being adapted to be frictionally inserted into said opening and frictionally engageable therein,
    an upper end portion of said intermediate rod member including an anchoring member for securement of said intermediate rod member to said dental prosthetic structure,
    said hollow sleeve member including a saddle with n upper end thereof and extending laterally outward from a proximal end of said opening,
    said sleeve member and said saddle forming an insert assembly,
    a lower peripheral surface of said saddle being conformal with a peripheral surface of said bored tooth stub,
    said dental prosthetic structure having an opening formed in a bottom peripheral surface thereof,
    means for securing said anchoring member with said last-mentioned opening, and
    the bottom surface of said dental prosthetic structure being substantially conformal with a peripheral upper surface of said saddle and in registry therewith.

2. A dental prosthetic structure in accordance with claim 1, wherein
    said anchoring member comprises the upper end portion of said intermediate rod member which upper portion is bent over toward itself in spaced relationship.

3. A dental prosthetic assembly in accordance with claim 2, wherein
    the opening formed in said sleeve member is of cylindrical configuration.

4. A dental prosthetic assembly in accordance with claim 3, wherein
    said intermediate rod member has a substantially circular cross section.

5. A dental prosthetic assembly comprising a hollow sleeve member adapted to be secured within a conformally shaped bore in a tooth stub in a patient's mouth,
    said sleeve member being provided with a longitudinal opening and a closed distal end,
    an intermediate member,
    a dental prosthetic structure, a lower end portion of said intermediate member being adapted to be inserted into said opening and engageable therein, an upper end portion of said intermediate member including an anchoring element for securement of said intermediate member to said dental prosthetic structure, said hollow sleeve member including a saddle disposed at an upper end thereof and extending laterally outward from a proximal end of said opening, said sleeve member and said saddle forming an assembly, a lower peripheral surface of said saddle being conformal with a peripheral surface of said bored tooth stub, said dental prosthetic structure being provided with an opening formed in a bottom peripheral surface thereof, and means for securing said anchoring element with said last-mentioned opening.

6. A dental prosthetic structure in accordance with claim 5, wherein said bottom surface of said dental prosthetic structure is substantially conformal with a peripheral upper surface of said saddle and in registry therewith.

7. A dental prosthetic structure in accordance with claim 5, wherein said intermediate member defines a rod provided with a substantially circular cross section.

8. A dental prosthetic structure in accordance with claim 5, wherein said anchoring element includes a portion bent over toward itself in spaced relationship.

9. A method of forming a dental prosthetic assembly including a tooth stub disposed in a patient's mouth and comprising the steps of preparing said tooth stub for said dental prosthetic assembly including drilling of a substantially centrally disposed bore therein, forming a saddle integral with a preformed hollow sleeve member to thereby form an insert assembly, forming a bottom peripheral surface of said saddle conformally with an upper peripheral surface of said prepared tooth stub, positionally securing the hollow sleeve member in said bore to thereby positionally secure the insert assembly to the prepared tooth stub, securing an upper anchoring member of an intermediate rod member to a dental prosthetic structure, and frictionally inserting a lower end portion of said intermediate rod member into an opening in the hollow sleeve member to thereby positionally secure said dental prosthetic structure with respect to said tooth stub.

10. A method in accordance with claim 9 comprising the additional step of forming a bottom peripheral surface of said dental prosthetic structure conformally with an upper peripheral surface of said saddle.

11. A method in accordance wit claim 10 comprising the additional steps of forming the upper anchoring member of said intermediate rod member by bending an upper portion of said rod member over toward itself in spaced relationship, providing an opening in the bottom surface of said dental prosthetic structure of a sufficient depth to receive said anchoring member, and securing said anchoring member within the opening in said dental prosthetic structure.

* * * * *